(12) United States Patent
Asterjadhi et al.

(10) Patent No.: US 10,361,832 B2
(45) Date of Patent: Jul. 23, 2019

(54) BLOCK ACKNOWLEDGMENT GENERATION AND SELECTION RULES

(71) Applicant: QUALCOMM Incorporated, San Diego, CA (US)

(72) Inventors: Alfred Asterjadhi, San Diego, CA (US); George Cherian, San Diego, CA (US); Simone Merlin, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 37 days.

(21) Appl. No.: 15/492,932

(22) Filed: Apr. 20, 2017

(65) Prior Publication Data
US 2017/0310446 A1  Oct. 26, 2017

Related U.S. Application Data

(60) Provisional application No. 62/326,617, filed on Apr. 22, 2016.

(51) Int. Cl.
*H04L 1/16* (2006.01)
*H04L 1/18* (2006.01)
(Continued)

(52) U.S. Cl.
CPC .......... *H04L 5/0055* (2013.01); *H04L 1/1614* (2013.01); *H04L 1/1685* (2013.01);
(Continued)

(58) Field of Classification Search
CPC ... H04L 5/0055; H04L 1/1614; H04L 1/1685; H04L 1/1664; H04L 69/22; H04L 28/14;
(Continued)

(56) References Cited

U.S. PATENT DOCUMENTS

2006/0034317 A1* 2/2006 Hong ................. H04L 1/1614
370/445
2006/0048034 A1 3/2006 Cho
(Continued)

FOREIGN PATENT DOCUMENTS

EP 1626520 A1 2/2006
EP 2693816 A1 2/2014
(Continued)

OTHER PUBLICATIONS

International Search Report and Written Opinion—PCT/US2017/028927—ISA/EPO—dated Jul. 6, 2017.

*Primary Examiner* — Ivan O Latorre
(74) *Attorney, Agent, or Firm* — Arent Fox, LLP and Qualcomm, Incorporated

(57) ABSTRACT

A method, an apparatus, and a computer-readable medium for wireless communication are provided. In an aspect, the apparatus is configured to receive at least one frame from at least one wireless device and to generate a BA frame that may include a block ACK bitmap based on the received at least one frame. The BA frame may include a fragment number field and a bitmap length indicator within the fragment number field that indicates a length of the block ACK bitmap within the BA frame. The apparatus may be configured to transmit the generated BA frame to the at least one wireless device.

25 Claims, 9 Drawing Sheets

(51) Int. Cl.
    *H04L 5/00*           (2006.01)
    *H04L 29/06*         (2006.01)
    *H04W 28/06*        (2009.01)
    *H04W 28/14*        (2009.01)
    *H04W 84/12*        (2009.01)

(52) U.S. Cl.
    CPC ............ *H04L 1/1864* (2013.01); *H04L 69/22* (2013.01); *H04W 28/065* (2013.01); *H04W 28/14* (2013.01); *H04W 84/12* (2013.01)

(58) Field of Classification Search
    CPC .... H04L 84/12; H04L 1/1864; H04W 28/065; H04W 84/12; H04W 28/14
    See application file for complete search history.

(56) References Cited

U.S. PATENT DOCUMENTS

| | | | |
|---|---|---|---|
| 2006/0104300 A1* | 5/2006 | Ho | H04L 1/0083 |
| | | | 370/428 |
| 2013/0176939 A1* | 7/2013 | Trainin | H04L 1/1614 |
| | | | 370/328 |
| 2017/0093547 A1* | 3/2017 | Merlin | H04L 5/0055 |
| 2017/0111951 A1* | 4/2017 | Chu | H04L 1/1614 |
| 2018/0069662 A1* | 3/2018 | Sugaya | H04L 1/16 |
| 2018/0069663 A1* | 3/2018 | Du | H04L 1/1614 |
| 2018/0183548 A1* | 6/2018 | Gan | H04L 1/1614 |

FOREIGN PATENT DOCUMENTS

| | | |
|---|---|---|
| WO | 2006015252 A1 | 2/2006 |
| WO | 2014014577 A1 | 1/2014 |
| WO | 2016105515 A1 | 6/2016 |
| WO | 2017053148 A1 | 3/2017 |

\* cited by examiner

Unified Mapping for FN Field of BA Frames

| Fragment Number (402) | Starting Sequence Number (404) | Block ACK Bitmap (406) |
|---|---|---|

| Fragment Number (402) | | | | BA Bitmap Length Field [Octets] – Fragmentation Level [ON/OFF] (432) | Multi-STA Block ACK (434) | Maximum number of MSDUs/A-MSDUs that can be acknowledged (436) |
|---|---|---|---|---|---|---|
| B3 | B2 | B1 | B0 | Compressed Block ACK | | |
| 0 | 0 | 0 | 0 | Bitmap [8 Octets] – Frag [OFF] | Bitmap [8 Octets] – Frag [OFF] | 64 | (410)
| 0 | 0 | 1 | 0 | Bitmap [32 Octets] – Frag [OFF] | Bitmap [32 Octets] – Frag [OFF] | 256 | (412)
| 0 | 0 | 2 | 0 | Reserved | Bitmap [4 Octets] – Frag [OFF] | 32 | (414)
| 0 | 0 | 3 | 0 | Reserved | Bitmap [2 Octets] – Frag [OFF] | 16 (if not Reserved) | (416)
| 0 | 0 | 0 | 1 | Bitmap [8 Octets] – Frag [ON] | Bitmap [8 Octets] – Frag [ON] | 16 | (418)
| 0 | 0 | 1 | 1 | Bitmap [32 Octets] – Frag [ON] | Bitmap [32 Octets] – Frag [ON] | 64 | (420)
| 0 | 0 | 2 | 1 | Reserved | Bitmap [4 Octets] – Frag [ON] | 4 | (422)
| 0 | 0 | 3 | 1 | Reserved | Bitmap [2 Octets] – Frag [ON] | 4 (if not Reserved) | (424)
| 1 | Any | Any | Any | Reserved | | | (426)

FIG. 4

BLOCK ACKNOWLEDGMENT GENERATION AND SELECTION RULES

CROSS-REFERENCE TO RELATED APPLICATION(S)

This application claims the benefit of U.S. Provisional Application Ser. No. 62/326,617, entitled "BLOCK ACK GENERATION AND SELECTION RULES" and filed on Apr. 22, 2016, which is expressly incorporated by reference herein in its entirety.

BACKGROUND

Field

The present disclosure relates generally to communication systems, and more particularly, to selecting and generating acknowledgments (ACKs) including block ACKs.

Background

In many telecommunication systems, communications networks are used to exchange messages among several interacting spatially-separated devices. Networks may be classified according to geographic scope, which could be, for example, a metropolitan area, a local area, or a personal area. Such networks would be designated respectively as a wide area network (WAN), metropolitan area network (MAN), local area network (LAN), wireless local area network (WLAN), or personal area network (PAN). Networks also differ according to the switching/routing technique used to interconnect the various network nodes and devices (e.g., circuit switching vs. packet switching), the type of physical media employed for transmission (e.g., wired vs. wireless), and the set of communication protocols used (e.g., Internet protocol suite, Synchronous Optical Networking (SONET), Ethernet, etc.).

Wireless networks are often preferred when the network elements are mobile and thus have dynamic connectivity needs, or if the network architecture is formed in an ad hoc, rather than fixed, topology. Wireless networks employ intangible physical media in an unguided propagation mode using electromagnetic waves in the radio, microwave, infra-red, optical, etc., frequency bands. Wireless networks advantageously facilitate user mobility and rapid field deployment when compared to fixed wired networks.

SUMMARY

The systems, methods, computer-readable media, and devices of the invention each have several aspects, no single one of which is solely responsible for the invention's desirable attributes. Without limiting the scope of this invention as expressed by the claims which follow, some features will now be discussed briefly. After considering this discussion, and particularly after reading the section entitled "Detailed Description," one will understand how the features of this invention provide advantages for devices in a wireless network.

One aspect of this disclosure provides an apparatus (e.g., an access point or a station) for wireless communication. The apparatus may be configured to receive at least one frame from at least one wireless device. The apparatus may be configured to generate a block acknowledgment (BA) frame that may include a block acknowledge (ACK) bitmap based on the received at least one frame. The BA frame may include a fragment number field and a bitmap length indicator within the fragment number field that indicates a length of the block ACK bitmap within the BA frame. The apparatus may be configured to transmit the generated BA frame to the at least one wireless device.

BRIEF DESCRIPTION OF THE DRAWINGS

FIG. 4 illustrates a table for unified mapping of a fragment number subfield of BA frames.

DETAILED DESCRIPTION

Figure 1:
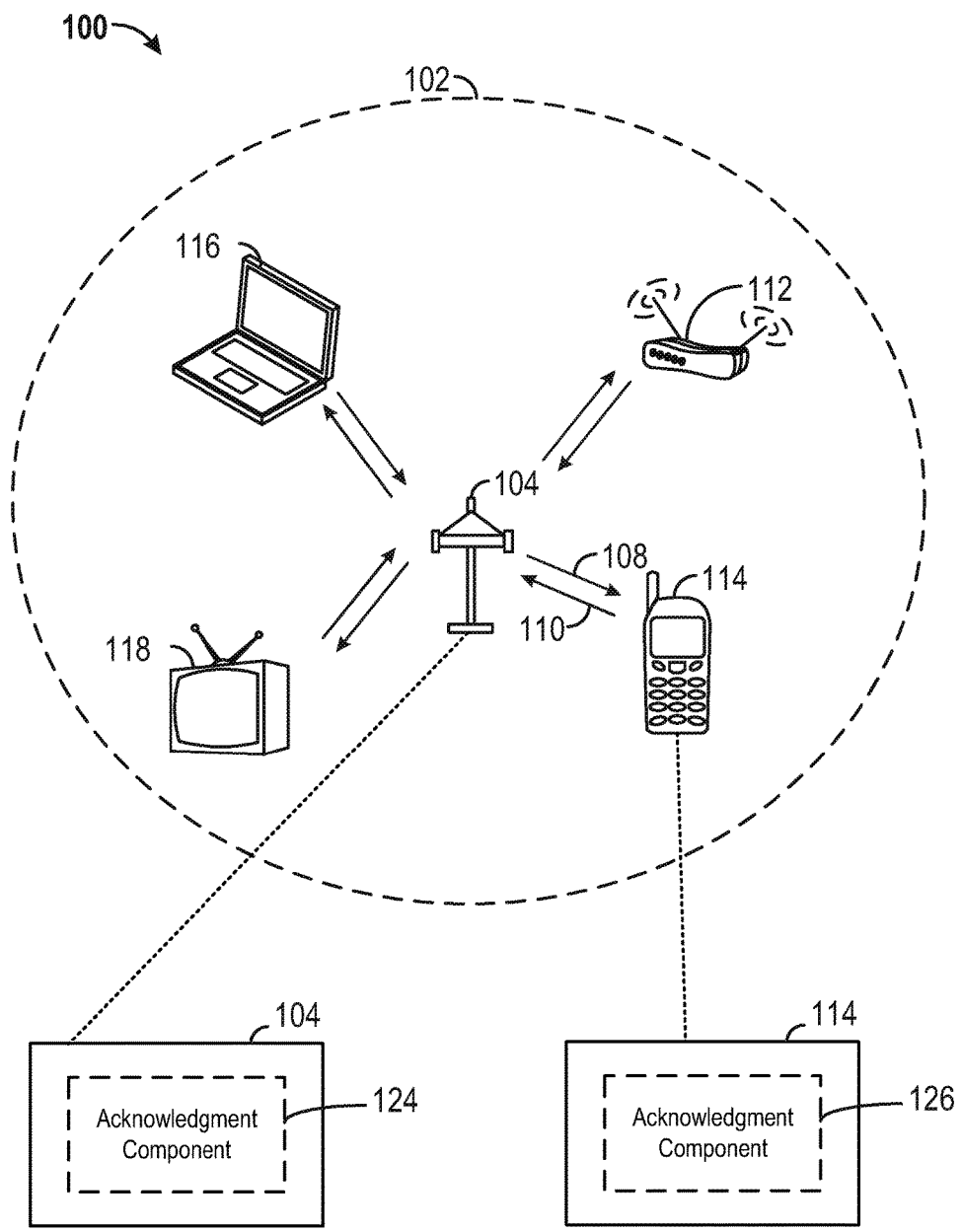
FIG. 1 shows an example wireless communication system in which aspects of the present disclosure may be employed.

Various aspects of the novel systems, apparatuses, computer-readable media, and methods are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the novel systems, apparatuses, computer program products, and methods disclosed herein, whether implemented independently of, or combined with, any other aspect of the invention. For example, an apparatus may be implemented or a method may be practiced using any number of the aspects set forth herein. In addition, the scope of the invention is intended to cover such an apparatus or method which is practiced using other structure, functionality, or structure and functionality in addition to or other than the various aspects of the invention set forth herein. It should be understood that any aspect disclosed herein may be embodied by one or more elements of a claim.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

Popular wireless network technologies may include various types of WLANs. A WLAN may be used to interconnect nearby devices together, employing widely used networking protocols. The various aspects described herein may apply to any communication standard, such as a wireless protocol.

In some aspects, wireless signals may be transmitted according to an 802.11 protocol using orthogonal frequency-division multiplexing (OFDM), direct-sequence spread spectrum (DSSS) communications, a combination of OFDM and DSSS communications, or other schemes. Implementations of the 802.11 protocol may be used for sensors, metering, and smart grid networks. Advantageously, aspects of certain devices implementing the 802.11 protocol may consume less power than devices implementing other wireless protocols, and/or may be used to transmit wireless signals across a relatively long range, for example about one kilometer or longer.

In some implementations, a WLAN includes various devices which are the components that access the wireless network. For example, there may be two types of devices: access points (APs) and clients (also referred to as stations or "STAs"). In general, an AP may serve as a hub or base station for the WLAN and a STA serves as a user of the WLAN. For example, a STA may be a laptop computer, a personal digital assistant (PDA), a mobile phone, etc. In an example, a STA connects to an AP via a Wi-Fi (e.g., IEEE 802.11 protocol) compliant wireless link to obtain general connectivity to the Internet or to other wide area networks. In some implementations, a STA may also be used as an AP.

An access point may also comprise, be implemented as, or known as a NodeB, Radio Network Controller (RNC), eNodeB, Base Station Controller (BSC), Base Transceiver Station (BTS), Base Station (BS), Transceiver Function (TF), Radio Router, Radio Transceiver, connection point, or some other terminology.

A STA may also comprise, be implemented as, or known as an access terminal (AT), a subscriber station, a subscriber unit, a mobile station, a remote station, a remote terminal, a user terminal, a user agent, a user device, a user equipment, or some other terminology. In some implementations, a STA may comprise a cellular telephone, a cordless telephone, a Session Initiation Protocol (SIP) phone, a wireless local loop (WLL) station, a personal digital assistant (PDA), a handheld device having wireless connection capability, or some other suitable processing device connected to a wireless modem. Accordingly, one or more aspects taught herein may be incorporated into a phone (e.g., a cellular phone or smartphone), a computer (e.g., a laptop), a portable communication device, a headset, a portable computing device (e.g., a personal data assistant), an entertainment device (e.g., a music or video device, or a satellite radio), a gaming device or system, a global positioning system device, or any other suitable device that is configured to communicate via a wireless medium.

In an aspect, MIMO schemes may be used for wide area WLAN (e.g., Wi-Fi) connectivity. MIMO exploits a radio-wave characteristic called multipath. In multipath, transmitted data may bounce off objects (e.g., walls, doors, furniture), reaching the receiving antenna multiple times through different routes and at different times. A WLAN device that employs MIMO will split a data stream into multiple parts, called spatial streams, and transmit each spatial stream through separate antennas to corresponding antennas on a receiving WLAN device.

The term "associate," or "association," or any variant thereof should be given the broadest meaning possible within the context of the present disclosure. By way of example, when a first apparatus associates with a second apparatus, it should be understood that the two apparatuses may be directly associated or intermediate apparatuses may be present. For purposes of brevity, the process for establishing an association between two apparatuses will be described using a handshake protocol that requires an "association request" by one of the apparatus followed by an "association response" by the other apparatus. It will be understood by those skilled in the art that the handshake protocol may require other signaling, such as by way of example, signaling to provide authentication.

Any reference to an element herein using a designation such as "first," "second," and so forth does not generally limit the quantity or order of those elements. Rather, these designations are used herein as a convenient method of distinguishing between two or more elements or instances of an element. Thus, a reference to first and second elements does not mean that only two elements can be employed, or that the first element must precede the second element. In addition, a phrase referring to "at least one of" a list of items refers to any combination of those items, including single members. As an example, "at least one of: A, B, or C" is intended to cover: A, or B, or C, or any combination thereof (e.g., A-B, A-C, B-C, and A-B-C).

As discussed above, certain devices described herein may implement the 802.11 standard, for example. Such devices, whether used as a STA or AP or other device, may be used for smart metering or in a smart grid network. Such devices may provide sensor applications or be used in home automation. The devices may instead or in addition be used in a healthcare context, for example for personal healthcare. They may also be used for surveillance, to enable extended-range Internet connectivity (e.g. for use with hotspots), or to implement machine-to-machine communications.

FIG. 1 shows an example wireless communication system 100 in which aspects of the present disclosure may be employed. The wireless communication system 100 may operate pursuant to a wireless standard, for example the 802.11 standard. The wireless communication system 100 may include an AP 104, which communicates with STAs (e.g., STAs 112, 114, 116, and 118).

A variety of processes and methods may be used for transmissions in the wireless communication system 100 between the AP 104 and the STAs. For example, signals may be sent and received between the AP 104 and the STAs in accordance with OFDM/OFDMA techniques. If this is the case, the wireless communication system 100 may be referred to as an OFDM/OFDMA system. Alternatively, signals may be sent and received between the AP 104 and the STAs in accordance with CDMA techniques. If this is the case, the wireless communication system 100 may be referred to as a CDMA system.

A communication link that facilitates transmission from the AP 104 to one or more of the STAs may be referred to as a downlink (DL) 108, and a communication link that facilitates transmission from one or more of the STAs to the AP 104 may be referred to as an uplink (UL) 110. Alternatively, a downlink 108 may be referred to as a forward link or a forward channel, and an uplink 110 may be referred to as a reverse link or a reverse channel. In some aspects, DL communications may include unicast or multicast traffic indications.

The AP 104 may suppress adjacent channel interference (ACI) in some aspects so that the AP 104 may receive UL communications on more than one channel simultaneously without causing significant analog-to-digital conversion (ADC) clipping noise. The AP 104 may improve suppression of ACI, for example, by having separate finite impulse response (FIR) filters for each channel or having a longer ADC backoff period with increased bit widths.

The AP 104 may act as a base station and provide wireless communication coverage in a basic service area (BSA) 102. A BSA (e.g., the BSA 102) is the coverage area of an AP (e.g., the AP 104). The AP 104 along with the STAs associated with the AP 104 and that use the AP 104 for communication may be referred to as a basic service set (BSS). It should be noted that the wireless communication system 100 may not have a central AP (e.g., AP 104), but rather may function as a peer-to-peer network between the STAs. Accordingly, the functions of the AP 104 described herein may alternatively be performed by one or more of the STAs.

The AP 104 may transmit on one or more channels (e.g., multiple narrowband channels, each channel including a frequency bandwidth) a beacon signal (or simply a "beacon"), via a communication link such as the downlink 108, to other nodes (STAs) of the wireless communication system 100, which may help the other nodes (STAs) to synchronize their timing with the AP 104, or which may provide other information or functionality. Such beacons may be transmitted periodically. In one aspect, the period between successive transmissions may be referred to as a superframe. Transmission of a beacon may be divided into a number of groups or intervals. In one aspect, the beacon may include, but is not limited to, such information as timestamp information to set a common clock, a peer-to-peer network identifier, a device identifier, capability information, a superframe duration, transmission direction information, reception direction information, a neighbor list, and/or an extended neighbor list, some of which are described in additional detail below. Thus, a beacon may include information that is both common (e.g., shared) amongst several devices and specific to a given device.

In some aspects, a STA (e.g., STA 114) may be required to associate with the AP 104 in order to send communications to and/or to receive communications from the AP 104. In one aspect, information for associating is included in a beacon broadcast by the AP 104. To receive such a beacon, the STA 114 may, for example, perform a broad coverage search over a coverage region. A search may also be performed by the STA 114 by sweeping a coverage region in a lighthouse fashion, for example. After receiving the information for associating, the STA 114 may transmit a reference signal, such as an association probe or request, to the AP 104. In some aspects, the AP 104 may use backhaul services, for example, to communicate with a larger network, such as the Internet or a public switched telephone network (PSTN).

In an aspect, the AP 104 may include one or more components for performing various functions. For example, the AP 104 may include an acknowledgment component 124 configured to receive at least one frame from at least one wireless device (e.g., the STA 114). The acknowledgment component 124 may be configured to generate a BA frame that may include a block ACK bitmap based on the received at least one frame. The BA frame may include a fragment number field and a bitmap length indicator within the fragment number field that indicates a length of the block ACK bitmap within the BA frame. The acknowledgment component 124 may be configured to transmit the generated BA frame to the at least one wireless device.

In another aspect, the STA 114 may include one or more components for performing various functions. For example, the STA 114 may include an acknowledgment component 126 configured to receive at least one frame from at least one wireless device (e.g., the AP 104). The acknowledgment component 126 may be configured to generate a BA frame that may include a block ACK bitmap based on the received at least one frame. The BA frame may include a fragment number field and a bitmap length indicator within the fragment number field that indicates a length of the block ACK bitmap within the BA frame. The acknowledgment component 126 may be configured to transmit the generated BA frame to the at least one wireless device.

In a Wi-Fi network (e.g., a future Wi-Fi network compliant with IEEE 802.11ax), wireless devices may use at least two frame formats for BA frames including compressed block ACK (C-BA) and multi-STA block ACK (M-BA). Each of the two frames may have signaling details for signaling bitmap lengths within the frame. In an aspect, the C-BA and M-BA may use a fragment number field for purposes of signaling the bitmap length. As further described below, signaling details are defined for a BA frame as are length selection rules. That is, signaling may need to be defined to indicate which frame and frame length is to be used. As further provided below, this disclosure provides details related to the mapping of a fragment number field of BA frames for indicating BA bitmap lengths. This disclosure further discusses the negotiation and selection of BA frames during a BA session, including a BA request (BAR) solicitation of BA frames.

Figure 2:
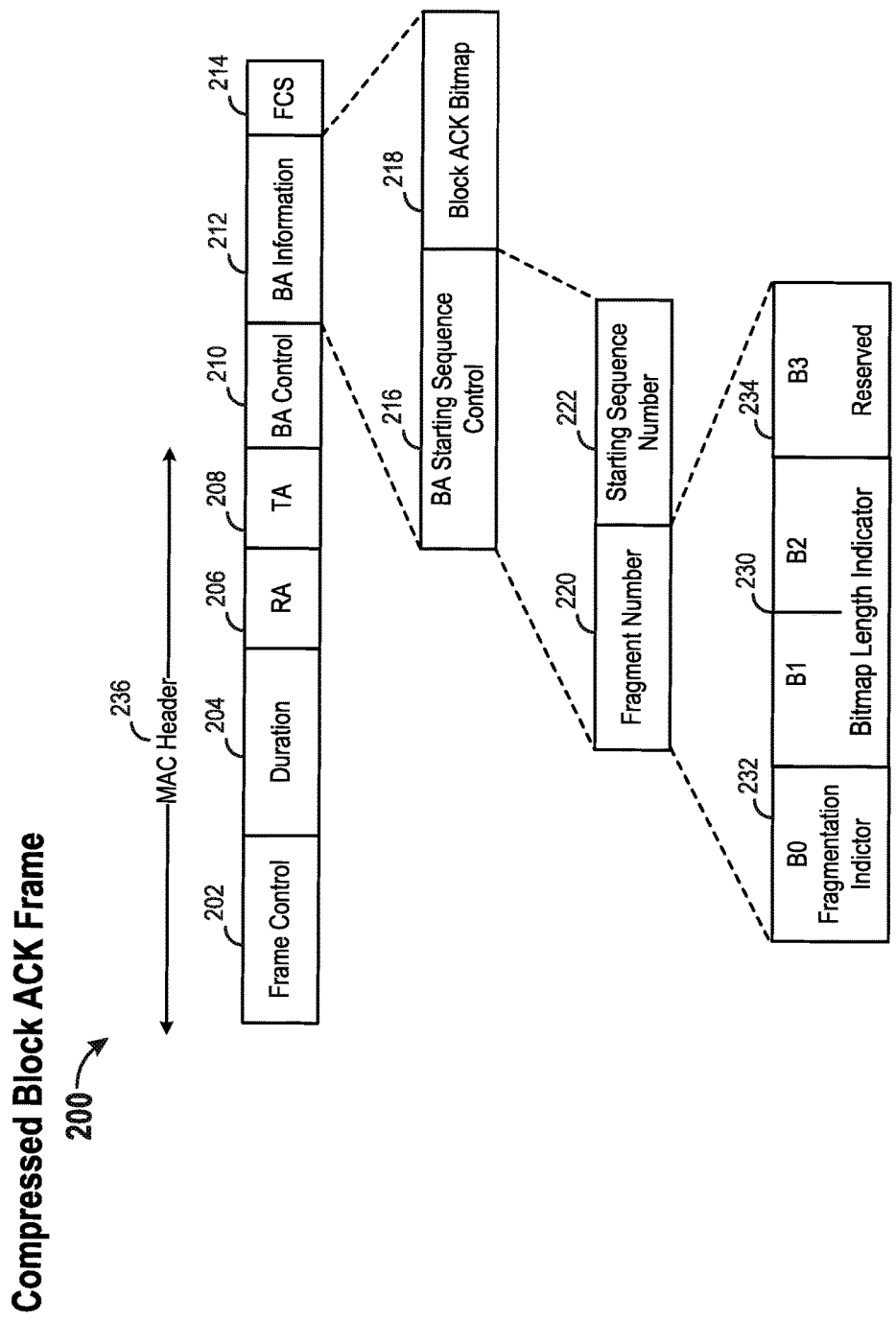
FIG. 2 illustrates an exemplary diagram of a compressed block ACK frame.

FIG. 2 illustrates an exemplary diagram of a compressed block ACK frame 200. Referring to FIG. 2, the C-BA may include a frame control field 202 (e.g., of 2 octets in length), a duration field 204 (e.g., of 2 octets in length), a receive address (RA) field 206 (e.g., of 6 octets in length), a transmit address (TA) field 208 (e.g., of 6 octets in length), a BA control field 210 (e.g., of 2 octets in length), a BA information field 212 (e.g., of variable length), and a frame check sequence (FCS) field 214 (e.g., of 4 octets in length) for error detection. In an aspect, the frame control field 202, the duration field 204, the RA field 206, and the TA field 208 may, together, constitute the MAC header 236 of the C-BA frame. The BA information field 212 may include a BA starting sequence control field 216 (e.g. of 2 octets in length) and a BA bitmap 218 (e.g., 8, 32, or some other number of octets in length). The BA starting sequence control field 216 may include a fragment number field 220 and a starting sequence number field 222. In one aspect, the fragment number may be 0 in a C-BA frame to indicate no fragmentation. In another aspect, the fragment number may be set to 1 to indicate re-mapping of the BA bitmap for fragmentation level 3. In another aspect, the fragment number field 220 may have 4 bits and the starting sequence number field 222 may have 12 bits. In this aspect, the fragment number field may indicate whether any of the received data is part of a frame that has been fragmented into multiple smaller segments of data, and the received data constitutes one of multiple fragments that represent a single frame of data. To indicate the length of the BA bitmap 218, however, the fragment number field 220 may include additional information. One or more bits of the fragment number field 220 may correspond to a bitmap length indicator 230. For example, assuming the fragment number field 220 has 4 bits (B0, B1, B2, B3), B0 may be a fragmentation indicator 232. The fragmentation indicator 232 may be used to indicate whether fragmentation is utilized (e.g., indicate that re-mapping of BA bitmap for fragmentation level 3 is ON). B1 and B2 of the fragment number field 220 may be used to indicate the length of the BA bitmap 218 for the C-BA frame. In another aspect, two values may be defined for the length of the BA bitmap 218 (e.g., 8 or 32 bytes)—additional values may also be defined. B3 may be reserved 234. In another aspect, C-BA frames may be used to acknowledge un-fragmented frames. (In other examples, the order of the bits may be changed.) FIG. 2 illustrates one example order for blocks of information in the compressed block ACK frame 200. The blocks of information may be in other orders as long as the same information is conveyed. Furthermore, bits within a block of information may be in other orders. For example, in another aspect, B0 may be reserved, B1 may be a fragmentation indicator, and B2 and B3 may be the fragment number field.

Figure 3:
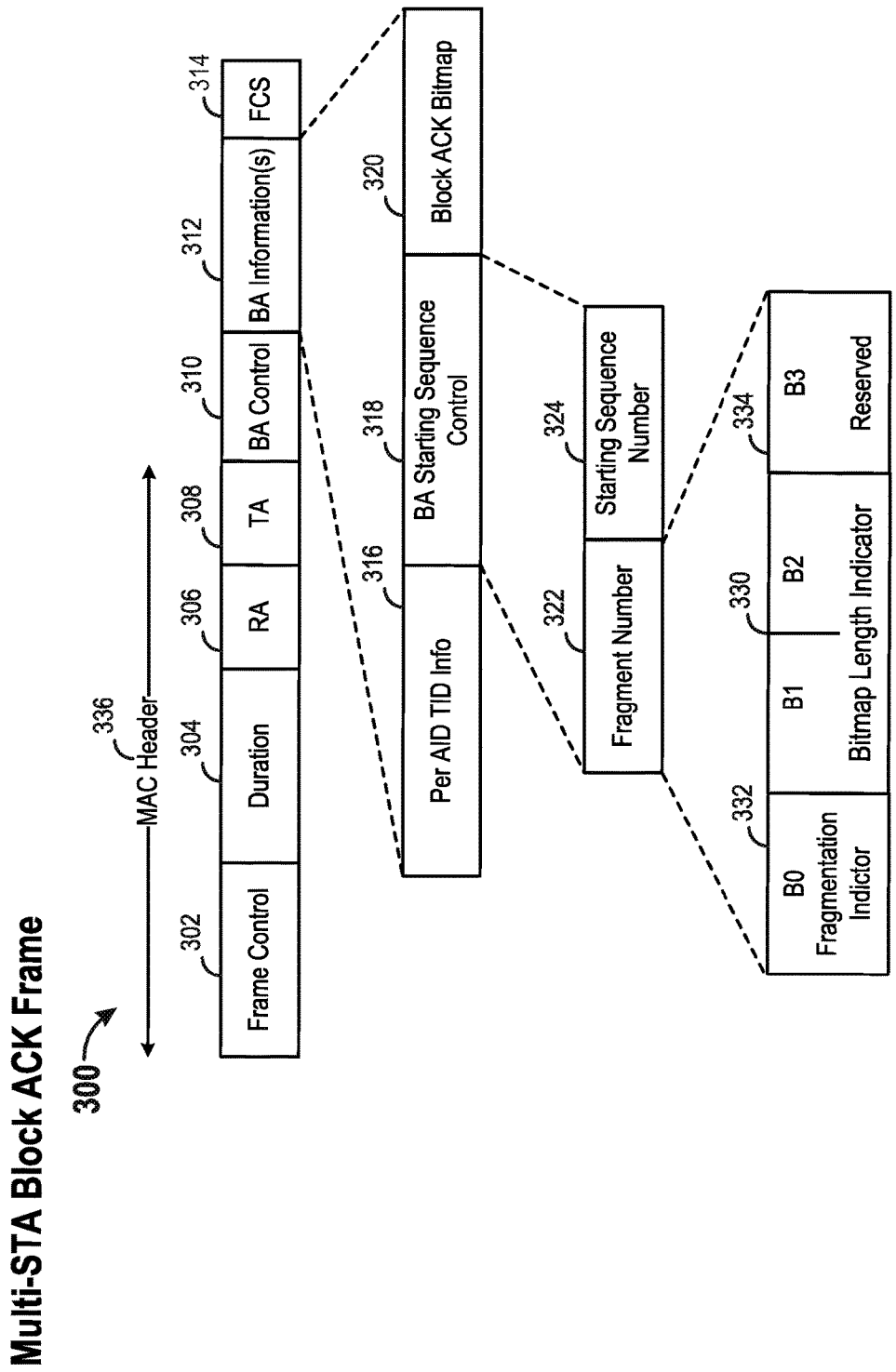
FIG. 3 illustrates an exemplary diagram of a multi-STA block ACK frame.

FIG. 3 illustrates an exemplary diagram of a Multi-STA Block ACK Frame 300. Referring to FIG. 3, the M-BA frame may include a frame control field 302 (e.g., of 2 octets in length), a duration field 304 (e.g., of 2 octets in length), an RA field 306 (e.g., of 6 octets in length), a TA field 308 (e.g., of 6 octets in length), a BA control field 310 (e.g., of 2 octets in length), a BA information field 312 (e.g., of variable length), and an FCS field 314 (e.g., of 4 octets in length) for error detection. In an aspect, the frame control field 302, the duration field 304, the RA field 306, and the TA field 308 may, together, constitute the MAC header 336 of the M-BA frame. In an aspect, there may be multiple instances of the BA information field 312, one instance for each unique identifier (AID) and traffic identifier (TID) set. In this aspect, no BA information field may be associated with the same AID and TID set. The BA information field 312 may include a per AID TID information field 316 (e.g., of 2 octets in length), a BA starting sequence control field 318 (e.g., of 0 or 2 octets in length), and a BA bitmap 320 (e.g., of 0, 4, 8, 32 or any other number of bytes). The BA starting sequence control field 318 may include a fragment number field 322 and a starting sequence number field 324. In an aspect, the fragment number field 322 may have 4 bits and the starting sequence number field 324 may have 12 bits. The fragment number field 322 may indicate whether any of the received data is part of a frame that has been fragmented into multiple smaller segments of data, and the received data constitutes one of multiple fragments that represent a single frame of data. To indicate the length of the BA bitmap 320, however, the fragment number field 322 may include additional information. One or more bits of the fragment number field 220 may correspond to a bitmap length indicator 330. For example, assuming the fragment number field 322 may have 4 bits (B0, B1, B2, B3), B0 may be used a fragmentation indicator 332. The fragmentation indicator 332 may be to indicate whether fragmentation is utilized (e.g., indicate that re-mapping of BA bitmap for fragmentation level 3 is ON). B1 and B2 of the fragment number field 220 may be used to indicate the length of the BA bitmap 320 for the M-BA frame. Multiple lengths may be defined (e.g., 0, 4, 8, 32 or another number of bytes). B3 may be reserved 334. (In other examples, the order of the bits may be changed.) FIG. 3 illustrates one example order for blocks of information in the Multi-STA Block ACK Frame 300. The blocks of information may be in other orders as long as the same information is conveyed. Furthermore, bits within a block of information may be in other orders. For example, in another aspect, B0 may be reserved, B1 may be a fragmentation indicator, and B2 and B3 may be the fragment number field.

FIG. 4 illustrates a subset of an example frame 400 and a table 430. The table illustrates an example of a unified mapping of a fragment number field of BA frames. Referring to table 430 and the subset of an example frame 400, a fragment number field 402 may correspond to the fragment number field 220 or the fragment number field 322. A starting sequence number field 404 may correspond to the starting sequence number field 222 or the starting sequence number field 324. The BA bitmap 406 may correspond to the BA bitmap 218 or the BA bitmap 320. As illustrated in the example frame 400, the starting sequence number filed 404 may be between the fragmentation number field 402 and the BA bitmap 406.

Referring to FIG. 4, as illustrated in the table 430, the fragment number field 402 may have 4 columns of bits (B0, B1, B2, B3). The columns of bits (B0, B1, B2, B3) may map to various states of a BA bitmap length field 432 and fragmentation level 434 as well as a maximum number of MSDUs/A-MSDUs that can be acknowledged 436. The various states may indicate different BA bitmap lengths for the BA bitmap 406. The columns associated with B3 and B0 are actual bit values, whereas the columns associated with B2 and B1 are decimal representations of bit values. For example, 0 corresponds to 00 (B2=0, B1=0), 1 corresponds to 01, 2 corresponds to 10, and 3 corresponds to 11. In a first row 410, when the fragment number field is set to 0000, then either C-BA or M-BA may be used, the BA bitmap is 8 bytes in length and fragmentation is OFF for both C-BA and M-BA (e.g., not acknowledging an MSDU fragment). The maximum number of medium access control (MAC) service data units (MSDUs) or aggregated MSDUs (A-MSDUs) that can be acknowledged is 64 (e.g., 8*8). In aspect, fragmentation refers to the number of fragments that an MSDU for example may be fragmented. For example, an MSDU may be separated into 4 fragments, and therefore, each bit in the bitmap corresponds to 1 fragment, and 4 bits may be needed to acknowledgment a single MSDU (one bit for each fragment). In a second row 412, when the fragment number field is set to 0010, then either C-BA or M-BA may be used, and the BA bitmap is 32 bytes in length and fragmentation is OFF for both C-BA and M-BA. The maximum number of MSDUs or A-MSDUs that can be acknowledged is 256. In a third row 414, when the fragment number subfield is set to 0100, then M-BA may be used. The BA bitmap is 4 in bytes length and fragmentation is OFF for the M-BA. The maximum number of MSDUs or A-MSDUs that can be acknowledged is 32. In a fourth row 416, when the fragment number subfield is set to 0110, then M-BA may be used. The BA bitmap is 2 bytes in length and fragmentation is OFF for M-BA. The maximum number of MSDUs or A-MSDUs that can be acknowledged is 16 (if not reserved). In a fifth row 418, when the fragment number subfield is set to 0001, then C-BA or M-BA may be used. The BA bitmap is 8 bytes in length and fragmentation is ON for C-BA and M-BA. In other words, the C-BA or the M-BA may be acknowledging one or more fragments of the MSDU, for example. The maximum number of MSDUs or A-MSDUs that can be acknowledged is 16. In an aspect, due the fragmentation, the number of maximum MSDUs/A-MSDUs may be reduced. In a sixth row 420, when the fragment number field is set to 0011, then C-BA or M-BA may be used. The BA bitmap is 32 bytes in length and fragmentation is ON for C-BA and M-BA. The maximum number of MSDUs or A-MSDUs that can be acknowledged is 64. In a seventh row 422, when the fragment number subfield is set to 0101, then M-BA may be used. The BA bitmap is 4 bytes in length and fragmentation is ON for M-BA. The maximum number of MSDUs or A-MSDUs that can be acknowledged is 4. In an eighth row 424, when the fragment number subfield is set to 0111, then M-BA may be used. The BA bitmap is 2 bytes in length and fragmentation is ON for M-BA. The maximum number of MSDUs or A-MSDUs that can be acknowledged is 4 (if not reserved). When the bit B3 is set to 1, other rules may also be determined and used. As illustrated in FIG. 4, the various states generally do not impact the structure for the block of the starting sequence number 404.

In wireless communication, wireless devices may perform block ACK negotiation and selection. For example, a STA may negotiate block ACK rules and selections with an AP and vice versa. Similarly, STAs may negotiate block ACK rules and selections with other STAs. The originator or recipient of the data may negotiate BA operation parameters during a setup period (e.g., a high throughput (HT)-immediate BA setup). During the setup period, other parameters associated with a traffic identifier, including buffer size and other parameters for data transmission may also be negotiated. In an aspect, a MAC protocol data unit (MPDU) may consume a buffer associated with the buffer size.

Both C-BA and M-BA frames may be used within a wireless network and both may have variable bitmap lengths. In an aspect, the M-BA may be used as a response frame for uplink (UL) multi-user (MU) physical convergence layer procedure (PLCP) protocol data units (PPDUs), multi-TID A-MPDUs, etc. A value of 15 in the TID subfield in the per STA info field of an M-BA frame may indicate the successful acknowledgment of a management frame that requires an immediate response. The ACK policy indicating the immediate response may be carried in a soliciting A-MPDU. In another aspect, UL-MU transmission of M-BA frames are allowed in response to a multi-TID A-MPDU in DL MU transmission. The value of the AID field in M-BA may be associated with one or more (including all) of the STAs to be acknowledged. In another aspect, MPDUs from multiple TIDs that ask for ACK/BA acknowledgment and one management frame that asks for ACK acknowledgment may be aggregated in one A-MPDU for MU transmission. The recipient may indicate a maximum number of TID MPDUs that the originator may aggregate in multi-TID A-MPDU.

As discussed, wireless devices may negotiate ACK operation parameters. In an aspect, BA bitmap length may be negotiated during BA setup (for each TID). The BA bitmap length of a BA frame may be tied to the negotiated buffer size. For example, if the negotiated buffer size is in the byte range [1, 64], then the BA bitmap length of 64 may be used during the BA session (or transmission). In another example, if the negotiated buffer size is in the byte range [65, 256], then the BA bitmap length of 256 may be used during the BA session.

In an aspect, the intended recipient of the BA frame may indicate a maximum number of TIDs that may be aggregated in an A-MPDU. The indication may be included in a high-efficiency (HE) capabilities information element (IE) sent by the recipient. If the maximum number is 0, then the recipient may not support multi-TID A-MPDUs. By contrast, a non-zero value may indicate support for multi-TID A-MPDU and the number of TIDs allowed in an A-MPDU. As such, one or more bits may be used to indicate multi-TID support. This indication may be valid for both APs and STAs (e.g., non-AP STAs). In another aspect, an AP may still dynamically govern the maximum number of TIDs that each STA is allowed to aggregate in their A-MPDUs within an UL MU PPDU by signaling that number to each STA in a trigger frame. The UL MU PPDU may refer to a trigger-based PPDU; that is, a PPDU sent in response to receiving a trigger frame.

When determining whether to transmit a BA frame, wireless devices may determine whether BA frames are supported, and if so, select the type of BA frame to use. In aspect, C-BA frames may be supported if HT-immediate BA is supported. In another aspect, M-BA frames may be supported if UL MU or multi-TID A-MPDU is supported. In an aspect, M-BA frames may be used a default response by an AP to UL MU PPDUs and by a STA to multi-TID A-MPDUs. In an embodiment, an M-BA frame may also include an action ACK frame. An action ACK frame may be an ACK frame that triggers response ACK frame. Wireless devices may be preconfigured with information that enable the devices to determine whether BA frames are supported, and if so, what type(s) of BA frames are supported. In another aspect, the originating device (device originating the data) may utilize a capability bit to indicate receiver (RX) support for all types of ACK signaling. The originator may keep track of the state of all transmitted MPDUs in an A-MPDU for all TIDs, an action ACK frame, and compare the state with each of the received multi-TID BA records.

In another aspect, control response frame generation for single-user (SU) PPDUs may use ACK/C-BA frames. The C-BA bitmap length may be negotiated during setup and may be used consistently during a BA session. This may ensure consistency in bandwidth, MCS, and NAV setting rules.

Figure 5A:
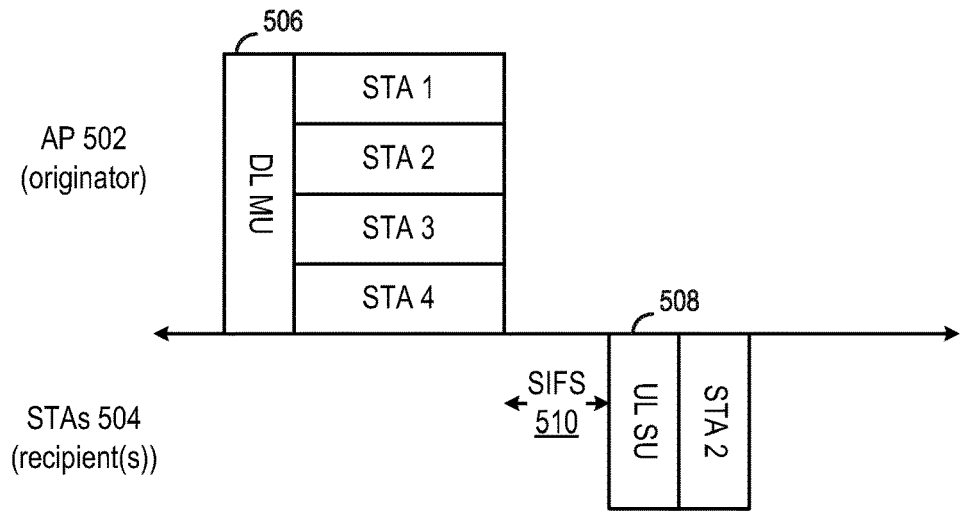
FIGS. 5A, 5B, 6A, and 6B illustrate a number of reference exchange sequences associated with generating different types of ACK frames.

FIGS. 5A, 5B, 6A, and 6B illustrate a number of reference exchange sequences 500, 550, 600, 650 associated with generating different types of ACK frames. FIGS. 5A, 5B, 6A, and 6B illustrate the transmissions between an originator (e.g., an AP 502, 552) and a recipient (e.g., STAs 504, 554). As such, the methods, techniques, and protocols described herein may apply to transmissions between an AP and a STA or between STAs. Referring to FIG. 5A, in a first reference exchange sequence 500, a DL MU PPDU 506 is transmitted from the AP 502 to STAs 504 (e.g., STAs 1, 2, 3, and 4). The DL MU PPDU 506 may include data multiplexed in time and in frequency to STAs 1, 2, 3, 4. After a short interframe space (SIFS) 510 or some other amount of interframe space, an UL SU response 508 (or control response frame) is transmitted. Referring to the first reference exchange sequence 500, there may be 1 originator of the DL MU PPDU (e.g., the AP 502). After receiving the DL MU PPDU 506, one or more STAs may transmit an UL SU response 508.

TABLE 1

ACK Rules for DL MU PPDU|SIFS|UL SU Response Sequence

| # of originators generating the DL MU PPDU | Content of the A-MPDU(s) carried in the DL MU PPDU | ACK policy setting | Control response frame generated by the recipient | UL PPDU response format |
|---|---|---|---|---|
| One (e.g., AP) | (A-)MPDU | No ACK or BA | No Response | N/A |
| One | VHT Single MPDU | Normal ACK | ACK Frame | SU |
| One | A-MPDU | Implicit BAR | C-BA frame | SU |
| One | Multi-TID A-MPDU* | Implicit BAR | M-BA frame | SU |

*Normal ACK and Implicit BAR are represented by the same value in the ACK policy To describe the different control response frames that may be included within the UL SU response, the first reference exchange sequence 500 may be discussed with reference to Table 1. As shown in the second column of Table 1, depending on the content of the A-MPDU(s) carried in the DL MU PPDU 506 (e.g., MPDU, A-MPDU, very high throughput (VHT) single MPDU, multi-TID A-MPDU) and the ACK policy setting associated with (or indicated within)

the DL MU PPDU 506 (or associated with each (A-)MPDU within the DL MU PPDU 506), the control response frame generated by the recipient of the DL MU PPDU 506 may be different. For example, referring to Table 1, in row 2, if an MPDU or A-MPDU is carried in the DL MU PPDU 506, and there is no ACK or BA policy set, then the recipient may not generate a response frame. In row 3, if a VHT single MPDU is carried in the DL MU PPDU 506, and a normal ACK policy is indicated (e.g., in the VHT single MPDU), then the recipient may transmit an ACK frame in SU format with respect to the UL PPDU response format. In row 4, if an A-MPDU is carried in the DL MU PPDU 506, and an implicit BAR applies, then a C-BA may be transmitted. In row 5, if an multi-TID A-MPDU is carried in the DL MU PPDU 506, and an implicit BAR applies, then an M-BA frame may be transmitted. In an aspect, the normal ACK and implicit BAR policies may be represented by a same value with respect to ACK policy (e.g., a same value in an ACK policy field within an MPDU). In an aspect, for soliciting the DL MU PPDU 506, the ACK policy for each quality of service (QoS) data contained in the (A-)MPDU may be set to the same value. The A-MPDU, under such conditions, may not contain an action ACK frame. Action ACK frames may not have an ACK policy field to differentiate between SU and MU. As such, one way may be enabled (e.g., UL MU may be enabled because it may be the most common case for DL MU responses).

Figure 5B:
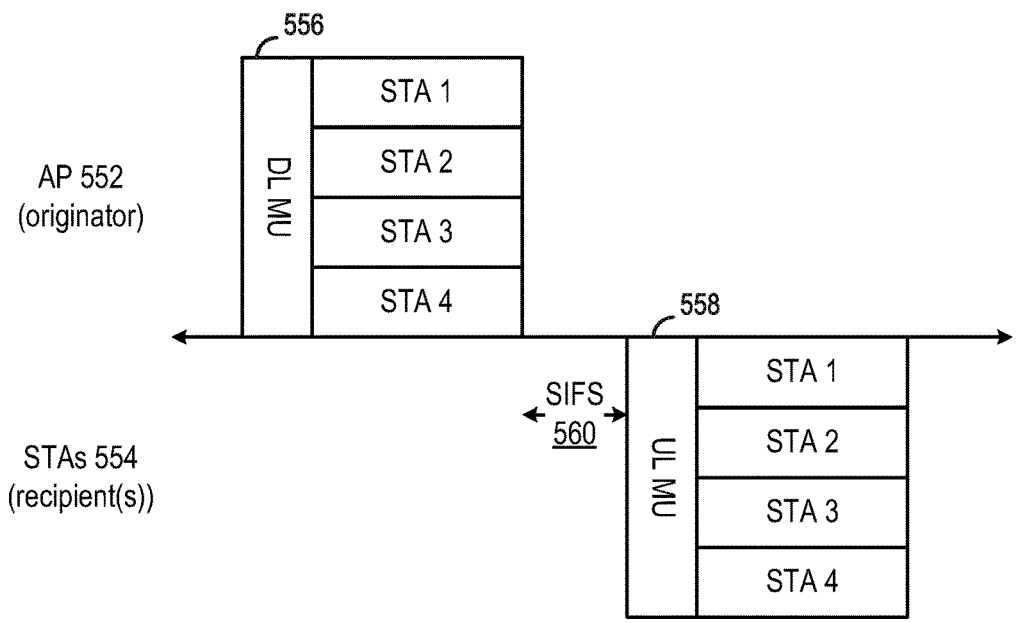

Referring to FIG. 5B, in a second reference exchange sequence 550, a DL MU PPDU 556 is transmitted by the AP 552 to STAs 554 (e.g., STAs 1, 2, 3, 4). The DL MU PPDU 556 may include data multiplexed in time and in frequency to STAs 1, 2, 3, 4. After a SIFS 560 or some other amount of interframe space, an UL MU response 558 (or control response frame) is transmitted. Referring to the second reference exchange sequence 550, there may be 1 originator of the DL MU PPDU 556 (e.g., the AP 552). After receiving the DL MU PPDU 556, one or more STAs may transmit an UL MU response 558.

the ACK policy setting, the control response frame generated by the recipient of the DL MU PPDU 556 may be different. For example, referring to Table 2, in row 2, if an MPDU/A-MPDU is carried in the DL MU PPDU 556, and there is no ACK or BA policy set, then all recipients may not generate a control response frame. In row 3, if a VHT single MPDU is carried in the DL MU PPDU 556, and an MU ACK policy applies (e.g., indicated in the VHT single MPDU), then one or more recipients may transmit an ACK frame in UL MU PPDU format. In an aspect, the STAs 554 may not solicit a response from the AP 552 to the UL MU response 558 if the trigger information (e.g., a trigger message) in the DL MU PPDU 556 was not a basic trigger frame or a basic trigger frame was not provided in the UL MU response. In another aspect, the STAs 554 may solicit a response from the AP 552 to the UL MU response 558 if the trigger information carried in the DL MU PPDU was a basic trigger frame. In another aspect, the MU ACK policy may be signaled by a value of PSMP ACK value of the ACK policy. In row 4, if an A-MPDU is carried in the DL MU PPDU 556, and an MU ACK policy applies or is signaled, then a C-BA may be transmitted. In row 5, if an multi-TID A-MPDU is carried in the DL MU PPDU 556, and an MU ACK policy applies or is signaled, then an M-BA frame may be transmitted. In an aspect, an A-MPDU may include an action ACK frame, which may not have an ACK policy field to differentiate between SU and MU. In another aspect, by default, the response to the DL multi-TID A-MPDU frames containing the MPDU with the action ACK frame may be in MU mode. In an aspect, for the soliciting DL MU PPDU, the ACK policy for each QoS data contained in the (A-)MPDU may be set to the same value. In another aspect, the recipient may respond to the DL MU PPDU 556 if the recipient is allocated a resource unit contained in one or more trigger frames or one or more control fields with UL MU responses (e.g., HE variant HT control fields).

Figure 6A:
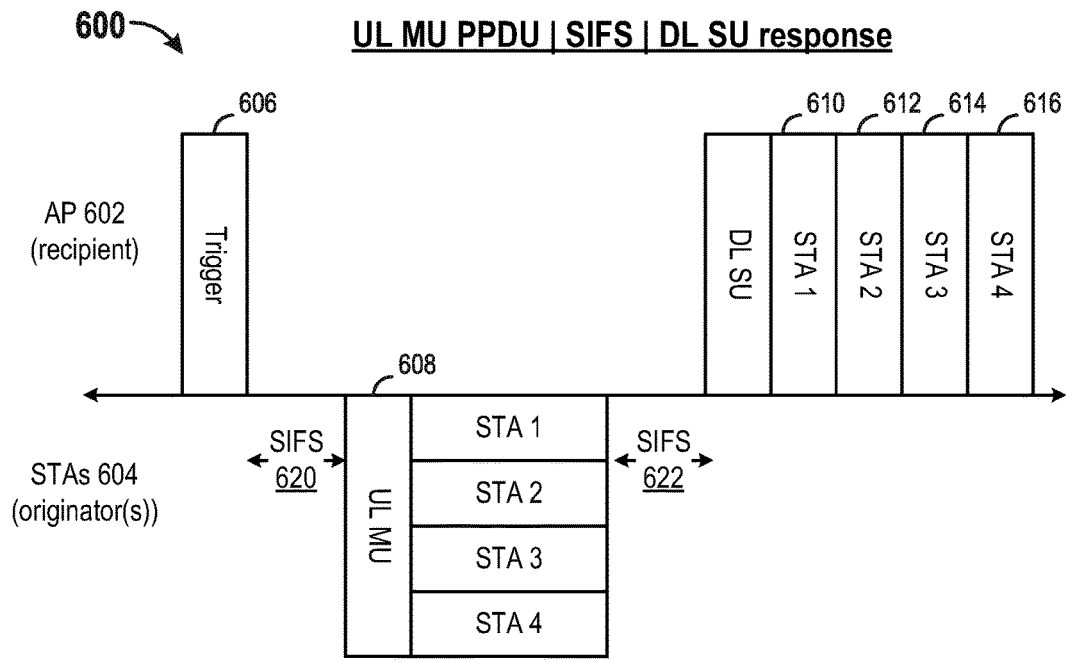

Referring to FIG. 6A, in a third reference exchange sequence 600, an AP 602 may transmit a trigger frame 606 to STAs 604 (e.g., STAs 1, 2, 3, 4). After a SIFS 620, the STAs 604 may transmit an UL MU PPDU 608 in response to the trigger frame 606. Then, after a SIFS 622 or some other amount of interframe space, the AP 602 may transmit DL SU frame responses 610, 612, 614, 616 to each of the STAs 604. Together, the DL SU frame responses 610, 612, 614, 616 carry in the MPDUs information for one or more STAs. An identifier (e.g., an AID that identifies each STA, which may then be followed by BA information) may be

TABLE 2

ACK Rules for DL MU PPDU|SIFS|UL MU Response Sequence

| # of originators generating the DL MU PPDU | Content of the A-MPDU(s) carried in the DL MU PPDU | ACK policy setting [# recipients] | Control response frame generated by the recipient | UL PPDU response format |
|---|---|---|---|---|
| One (e.g., AP) | (A-)MPDU | No ACK or BA [ALL] | No Response | N/A |
| One | VHT Single MPDU | MU ACK** [>0] | ACK Frame | UL MU PPDU* |
| One | A-MPDU | MU ACK [>0] | C-BA frame | UL MU PPDU* |
| One | Multi-TID A-MPDU*** | MU ACK [>0] | M-BA frame | UL MU PPDU* |

*STAs cannot solicit response from AP to the UL MU PPDU if the trigger info field in the DL MU PPDU did not indicate a basic trigger or if a trigger was not included in the UL MU response
*STAs can solicit a response from the AP to the UL MU PPDU if the trigger carried in the DL MU PPDU was a basic trigger (or a MU-BAR variant of the trigger)
**MU ACK is signaled by a value of power-save multi-poll (PSMP) ACK value in the ACK policy To describe the different control response frames that may be included within the UL MU response 558, the second reference exchange sequence 550 may be discussed with reference to Table 2. As shown in the second column of Table 2, depending on the content of the A-MPDU(s) carried in the DL MU PPDU 556 (e.g., MPDU, A-MPDU, very high throughput (VHT) single MPDU, multi-TID A-MPDU) and included in each MPDU. Referring to the third reference exchange sequence 600, there may be one or more originators of the UL MU PPDU 608 (e.g., one or more STAs 1, 2, 3, 4).

TABLE 3

ACK Rules for UL MU PPDU|SIFS|DL SU Response Sequence

| # of originators generating the UL MU PPDU | Content of the A-MPDU(s) carried in the UL MU PPDU | ACK policy setting [# originators] | Control response frame generated by the recipient (AP) | DL PPDU response format |
|---|---|---|---|---|
| One or more | (A-)MPDU | No ACK or BA [ALL] | No Response | N/A |
| One or more | VHT Single MPDU | Normal ACK [>0] | ACK [if 1 orig] or M-BA [if >1 orig] | SU* |
| One or more | A-MPDU | Implicit BAR [>0] | C-BA [if 1 orig] or M-BA [if >1 orig] | SU* |
| One or more | Multi-TID A-MPDU** | Implicit BAR [>0] | M-BA frame [if >0 orig] | SU* |

*STAs cannot solicit response to the UL MU PPDU if the trigger soliciting the UL MU PPDU was not a basic trigger or if a trigger was not included in the UL MU response field of the UL MU PPDU
*STAs can solicit a response to the UL MU PPDU if the trigger that solicited the UL MU PPDU was a basic trigger To describe the different control response frames that may be included within the DL SU frame responses 610, 612, 614, 616, the third reference exchange sequence 600 may be discussed with reference to Table 3. As shown in the second column of Table 3, depending on the content of the A-MPDU(s) carried in the UL MU PPDU 608 (e.g., MPDU, A-MPDU, very high throughput (VHT) single MPDU, multi-TID A-MPDU) and ACK policy setting in the third column, the control response frame generated by the recipient of the UL MU PPDU 608 may be different. For example, referring to Table 3, in row 2, if an MPDU/A-MPDU is carried in the UL MU PPDU 608, and there is no ACK or BA policy set, then the recipient may not generate a control response frame. In row 3, if a VHT single MPDU is carried in the UL MU PPDU 608, and a normal ACK policy applies (e.g., indicated in the VHT single MPDU), then the recipient may transmit an ACK frame if there is 1 originator (e.g., a single STA originator) or transmit a M-BA if there is more than 1 originator (e.g., multiple STAs). In an aspect, the STAs 604 may not solicit a response to the UL MU PPDU 608 if the trigger (e.g., a trigger message) soliciting the UL MU PPDU 608 was not a basic trigger frame or a trigger was not included in an UL MU response field of the UL MU PPDU 608. In another aspect, the STAs 604 may solicit a response to the UL MU PPDU 608 if the trigger that solicited the UL MU PPDU 608 was a basic trigger frame. In row 4, if an A-MPDU is carried in the UL MU PPDU 608, and an implicit BAR policy applies or is signaled, then a C-BA may be transmitted if the number of originators is 1 or an M-BA may be transmitted if the number of originators is greater than 1. In row 5, if an multi-TID A-MPDU is carried in the UL MU PPDU 608, and an implicit BAR applies or is signaled, then an M-BA frame may be transmitted if the number of originators is greater than 0. In an aspect, for the soliciting UL MU PPDU, the ACK policy for each QoS data contained in the (A-)MPDU may be set to the normal ACK/implicit BAR. In another aspect, an A-MPDU in a multi-TID A-MPDU may contain an action ACK frame.

The response to the multi-TID A-MPDU frame containing an action ACK frame in the MPDU may be an M-BA.

Figure 6B:
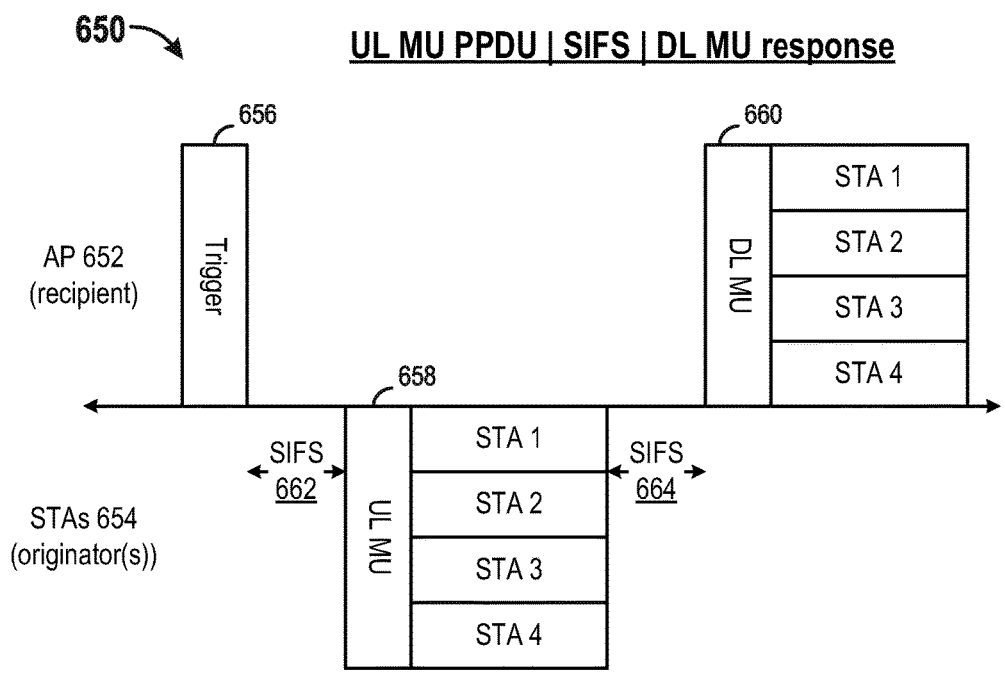

Referring to FIG. 6B, in a fourth reference exchange sequence 650, an AP 652 may transmit a trigger frame 656 to STAs 654 to solicit an UL MU PPDU 658. After a SIFS 662 or some other amount of interface space, the STAs 654 may transmit the UL MU PPDU 658. Referring to the fourth reference exchange sequence 650, there may be one or more originators of the UL MU PPDU 658 (e.g., one or more STAs). After receiving the UL MU PPDU 658, the AP 652 may transmit a DL MU response 660.

TABLE 4

ACK Rules for UL MU PPDU|SIFS|DL MU Response Sequence

| # of originators generating the UL MU PPDU | Content of the A-MPDU(s) carried in the UL MU PPDU | ACK policy setting [# originators] | Control response frame generated by the recipient (AP) | DL PPDU response format |
|---|---|---|---|---|
| One or more | (A-)MPDU | No ACK or BA [ALL] | No Response | N/A |
| One or more | VHT Single MPDU | Normal ACK [>0] | ACK [if 1 orig] or M-BA [if >1 orig] | MU* |
| One or more | A-MPDU | Implicit BAR [>0] | C-BA [if 1 orig] or M-BA [if >1 orig] | MU* |
| One or more | Multi-TID A-MPDU** | Implicit BAR [>0] | M-BA frame [if >0 orig] | MU* |

*STAs cannot solicit response to the UL MU PPDU if the trigger soliciting the UL MU PPDU was not a basic trigger or if a trigger was not included in the UL MU response field of the UL MU PPDU
*STAs can solicit a response to the UL MU PPDU if the trigger that solicited the UL MU PPDU was a basic trigger To describe the different control response frames that may be included within the DL MU response 660, the fourth reference exchange sequence 650 may be discussed with reference to Table 4. As shown in the second column of Table 4, depending on the content of the A-MPDU(s) carried in the UL MU PPDU 658 (e.g., MPDU, A-MPDU, very high throughput (VHT) single MPDU, multi-TID A-MPDU) and ACK policy setting in the third column, the control response frame generated by the recipient of the UL MU PPDU 658 may be different. For example, referring Table 4 in row 2, if an MPDU/A-MPDU is carried in the UL MU PPDU, and there is no ACK or BA policy set, then the recipient may not generate a response frame. In row 3, if a VHT single MPDU is carried in the UL MU PPDU 658, and a normal ACK policy applies (e.g., indicated in the VHT single MPDU), then the recipient may transmit an ACK frame if there is 1 originator or transmit a M-BA if there is more than 1 originator. In an aspect, STAs may not solicit a response to the UL MU PPDU 658 if the trigger (e.g., a trigger message) soliciting the UL MU PPDU 658 was not a basic trigger frame or a trigger was not include in an UL MU response field of the UL MU PPDU 658. In another aspect, STAs may solicit a response to the UL MU PPDU if the trigger that solicited the UL MU PPDU was a basic trigger frame. In row 4, if an A-MPDU is carried in the UL MU PPDU 658, and an implicit BAR policy applies or is signaled, then a C-BA may be transmitted if the number of originators is 1 or an M-BA may be transmitted if the number of originators is greater than 1. In row 5, if an multi-TID A-MPDU is carried in the UL MU PPDU 658, and an implicit BAR applies or is signaled, then an M-BA frame may be transmitted if the number of originators is greater than 0. In an aspect, for the soliciting UL MU PPDU, the ACK policy for each QoS data contained in the (A-)MPDU may be set to the normal ACK/implicit BAR. In another aspect, an A-MPDU in a multi-TID A-MPDU may contain an action ACK frame. The response to the multi-TID A-MPDU frame containing an action ACK frame in the MPDU may be an M-BA.

In another aspect, for BAR-solicited BA frames, the originator may solicit BA frames with a BAR frame. The BAR frame may be an MPDU carried in the PPDU, the last MPDU of the A-MPDU, or included as part of a BAR variant of the trigger frame. If the trigger frame is aggregated in an A-MPDU, then no BAR frames may be present. In another aspect, the BAR frame may be either a compressed BAR if a maximum number of TIDs supported by the recipient is 1. In another aspect, the BAR frame may be a multi-TID BAR if the maximum number of TIDs supported by the recipient is 1 or more. With respect to BAR frames, the same fragment number mapping as discussed with respect to the BA frames apply (e.g., as shown in FIG. 5). Further, per-PPDU acknowledgment rules of as discussed above may also apply.

In sum, wireless devices may be preconfigured with and negotiate BA selection rules for variable bitmaps and multi-TID support. Wireless devices may further utilize per-PPDU acknowledgment rules as discussed above.

Figure 7:
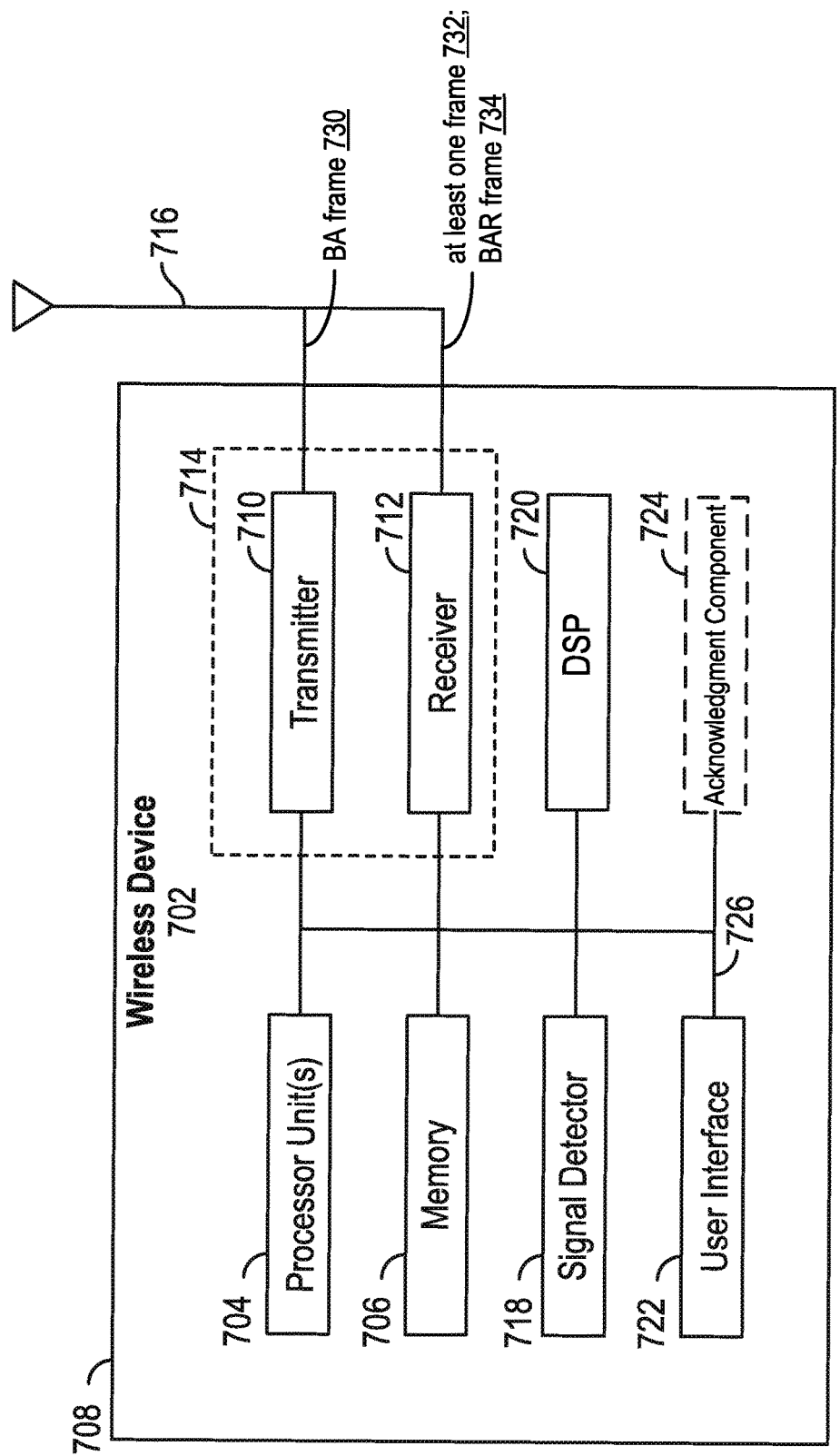
FIG. 7 is a functional block diagram of a wireless device that may be employed within the wireless communication system of FIG. 1 to generate block acknowledgments.

FIG. 7 is a functional block diagram of a wireless device 702 that may be employed within the wireless communication system 100 of FIG. 1 to generate block acknowledgments. The wireless device 702 is an example of a device that may be configured to implement the various methods described herein. For example, the wireless device 702 may be the AP 104 or the STA 114.

The wireless device 702 may include a processor 704 which controls operation of the wireless device 702. The processor 704 may also be referred to as a central processing unit (CPU). Memory 706, which may include both read-only memory (ROM) and random access memory (RAM), may provide instructions and data to the processor 704. A portion of the memory 706 may also include non-volatile random access memory (NVRAM). The processor 704 typically performs logical and arithmetic operations based on program instructions stored within the memory 706. The instructions in the memory 706 may be executable (by the processor 704, for example) to implement the methods described herein.

The processor 704 may comprise or be a component of a processing system implemented with one or more processors. The one or more processors may be implemented with any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable entities that can perform calculations or other manipulations of information.

The processing system may also include machine-readable media for storing software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the one or more processors, cause the processing system to perform the various functions described herein.

The wireless device 702 may also include a housing 708, and the wireless device 702 may include a transmitter 710 and/or a receiver 712 to allow transmission and reception of data between the wireless device 702 and a remote device. The transmitter 710 and the receiver 712 may be combined into a transceiver 714. An antenna 716 may be attached to the housing 708 and electrically coupled to the transceiver 714. The wireless device 702 may also include multiple transmitters, multiple receivers, multiple transceivers, and/or multiple antennas.

The wireless device 702 may also include a signal detector 718 that may be used to detect and quantify the level of signals received by the transceiver 714 or the receiver 712. The signal detector 718 may detect such signals as total energy, energy per subcarrier per symbol, power spectral density, and other signals. The wireless device 702 may also include a DSP 720 for use in processing signals. The DSP 720 may be configured to generate a packet for transmission. In some aspects, the packet may comprise a PPDU.

The wireless device 702 may further comprise a user interface 722 in some aspects. The user interface 722 may comprise a keypad, a microphone, a speaker, and/or a display. The user interface 722 may include any element or component that conveys information to a user of the wireless device 702 and/or receives input from the user.

When the wireless device 702 is implemented as an AP (e.g., AP 104) or as a STA (e.g., STA 114), the wireless device 702 may also comprise an acknowledgment component 724. The acknowledgment component 724 may be configured to receive at least one frame 732 from at least one wireless device. The acknowledgment component 724 may be configured to generate a BA frame 730 that may include a bitmap based on the received at least one frame. The BA frame may include a fragment number field and a bitmap length indicator within the fragment number field that indicates a length of the bitmap within the BA frame. The acknowledgment component 724 may be configured to transmit the generated BA frame to the at least one wireless device. In an aspect, the fragment number field may be a subfield within a BA starting sequence control field of the BA frame, and the BA starting sequence control field may be a subfield within a BA information field of the BA frame. In another aspect, the fragment number field may further indicate whether the BA frame is acknowledging fragmented data transmissions. In another aspect, the BA frame may be a compressed BA frame or a multi-station BA frame. In this aspect, the fragment number field may include a first bit, a second bit, a third bit, and a fourth bit, and the second and third bits may correspond to the bitmap length indicator. In another aspect, the BA frame may be the compressed BA frame, and the bitmap length indicator may indicate whether the bitmap is 8 or 32 octets in length. In another aspect, the BA frame may be the multi-station BA frame, and the bitmap length indicator may indicate whether the bitmap is 2, 4, 8, or 32 octets in length. In another configuration, the acknowledgment component 724 may be configured to select the compressed BA frame or the multi-station BA frame based on an acknowledgment policy setting and on a type of data received in the at least one frame. In another aspect, the at least one frame may not be an action acknowledgment frame. In another configuration, the acknowledgment component 724 may be further configured to negotiate the length of the bitmap with the at least one wireless device during a BA setup period. The acknowledgment component 724 may be configured to negotiate by communicating with the at least one wireless device to determine a buffer size and by determining the length of the bitmap based on the buffer size. In another configuration, the acknowledgment component 724 may be configured to receive a BAR frame 734 requesting the BA frame for the at least one frame. The BAR frame may include a second fragment number field and a second bitmap length indicator within the second fragment number field that indicates the length of the bitmap within the BA frame. The BA frame may be generated based on the received BAR frame.

The various components of the wireless device 702 may be coupled together by a bus system 726. The bus system 726 may include a data bus, for example, as well as a power bus, a control signal bus, and a status signal bus in addition to the data bus. Components of the wireless device 702 may be coupled together or accept or provide inputs to each other using some other mechanism.

Although a number of separate components are illustrated in FIG. 7, one or more of the components may be combined or commonly implemented. For example, the processor 704 may be used to implement not only the functionality described above with respect to the processor 704, but also to implement the functionality described above with respect to the signal detector 718, the DSP 720, the user interface 722, and/or the acknowledgment component 724. Further, each of the components illustrated in FIG. 7 may be implemented using a plurality of separate elements.

Figure 8:
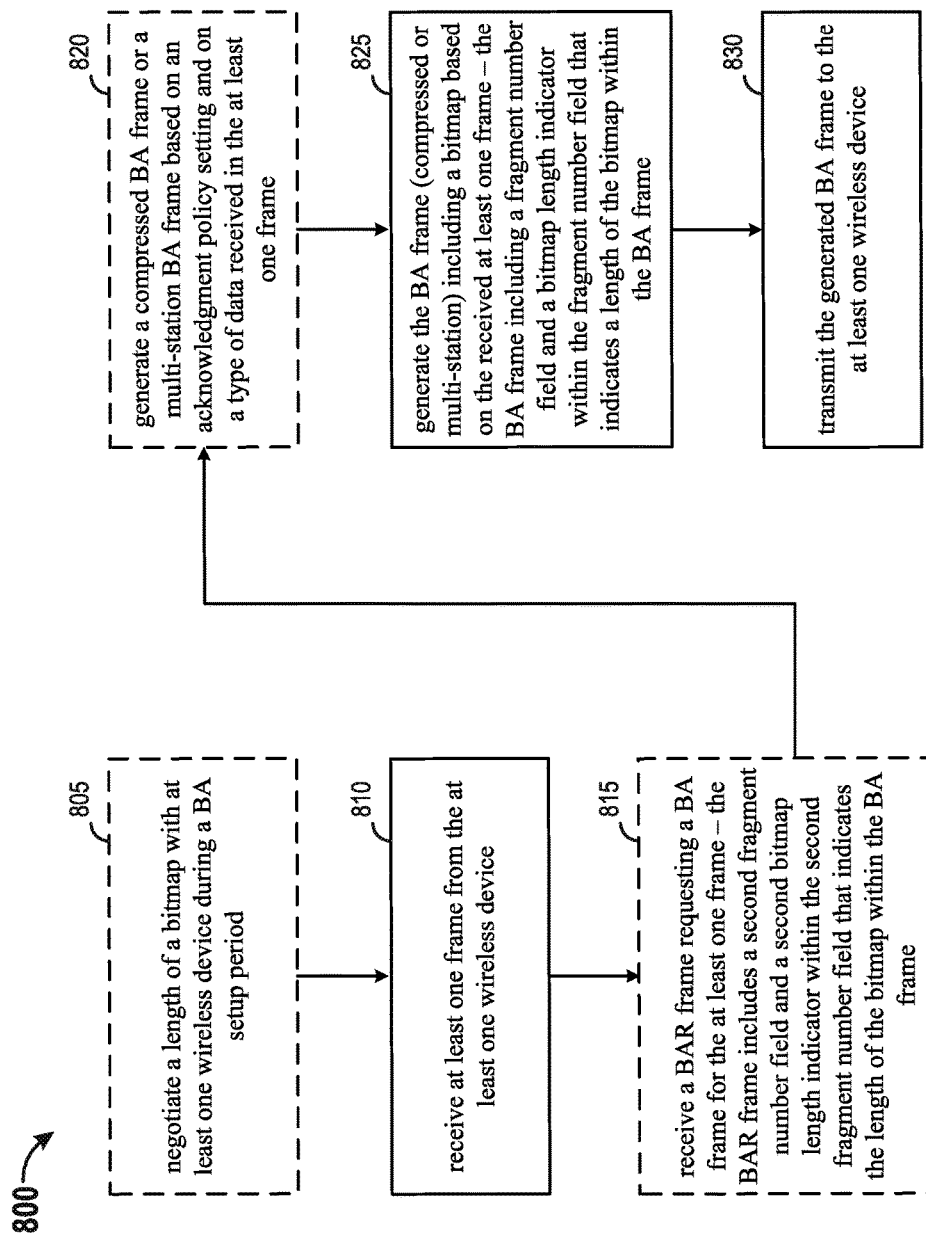
FIG. 8 is a flowchart of an exemplary method of ACK selection and generation.

FIG. 8 is a flowchart of an exemplary method 800 of ACK selection and generation. The method 800 may be performed using an apparatus (e.g., the STA 114, the AP 104, the APs 502, 552, 602, 652, the STAs 504, 554, 604, 654, or the wireless device 702, for example). Although the method 800 is described below with respect to the elements of wireless device 702 of FIG. 7, other components may be used to implement one or more of the steps described herein.

At block 805, the apparatus may negotiate a length of a bitmap (or a buffer) associated with one or more data transmissions with at least one wireless device during a BA setup period. The apparatus may negotiate the length by communicating with the at least one wireless device to determine a buffer size and by determining the length of the bitmap based on the buffer size. For example, referring to FIG. 5B, the apparatus may be the AP 652. The AP 652 may negotiate the length of the bitmap (e.g., the BA bitmap) by communicating with the STAs 654 to determine a buffer size for transmitting to the STAs 654 and by determining the length of the bitmap based on the buffer size. For example, if the negotiated buffer size is between [1, X], then the bitmap length may be X bits, and if the negotiated buffer size is between [X+1, Y], then the bitmap length may be Y bits. In this example, the negotiated buffer size may be 32 bytes.

At block 810, the apparatus may receive at least one frame from the at least one wireless device. For example, referring to FIG. 6B, the AP 652 may receive the UL MU PPDU 658 from the STAs 1, 2, 3, 4.

At block 815, the apparatus may receive a BAR frame requesting a BA frame for the at least one frame. The BAR frame may include a second fragment number field and a second bitmap length indicator within the second fragment number field that indicates the length of the bitmap within the BA frame. For example, after receiving the UL MU PPDU 658 from the STAs 1, 2, 3, 4, the AP 652 may receive a BAR frame from the STAs 1, 2, 3, 4. The BAR frame may include a second fragment number field that has a second bitmap length indicator that indicates the length of the BA bitmap to be transmitted by the AP 652.

At block 820, the apparatus may generate a C-BA frame or an M-BA frame based on an ACK policy setting on a type of data received in the at least one frame. For example, referring to FIG. 6B, the AP 652 may determine the contents of the UL MU PPDU 658. For example, whether the contents include an MPDU, an A-MPDU, a VHT single MPDU, or a multi-TID A-MPDU. In this case, the AP 652 may determine that the contents include an A-MPDU. Next, the AP 652 may determine the number of originators of the UL MU PPDU 658. Referring to FIG. 6B, there may be 4 originators (e.g., STAs 1, 2, 3, 4). Because the content of the UL MU PPDU 658 is an A-MPDU and because the number of originators is greater than 1, the AP 652 may generate a M-BA.

At block 825, the apparatus may generate the BA frame including a bitmap based on the received at least one frame. The BA frame may include a fragment number field and a bitmap length indicator within the fragment number field that indicates the length of the bitmap within the BA frame. In an aspect, the fragment number field may be a subfield within a BA starting sequence control field of the BA frame, and the BA starting sequence control field may be a subfield within a BA information field of the BA frame. In another aspect, the fragment number field may further indicate whether the BA frame is acknowledging fragmented data transmissions. The apparatus may generate the BA frame by generating a BA bitmap based on whether data was successfully received in the least one frame and by inserting the length of the bitmap into the fragment number field. The apparatus may generate the BA frame by inserting into the BA frame one or more fields shown in FIGS. 2 and 3. For example, referring to FIG. 6B, the AP 652 may generate the BA frame (or the DL MU response 660) by generating a BA bitmap based on whether the data within the UL MU PPDU 658 was successfully received. The AP 652 may determine that the bitmap length is 32 bytes, and therefore, set the bit value of the fragment number field to be 0010 (if data was not fragmented in the UL MU PPDU 658) or to be 0001 (if data was fragmented in the UL MU PPDU 658).

At block 830, the apparatus may transmit the generated BA frame to the at least one wireless device. For example, referring to FIG. 6B, the AP 652 may transmit the DL MU response 660 to the STAs 654 (e.g., STAs 1, 2, 3, 4).

Figure 9:
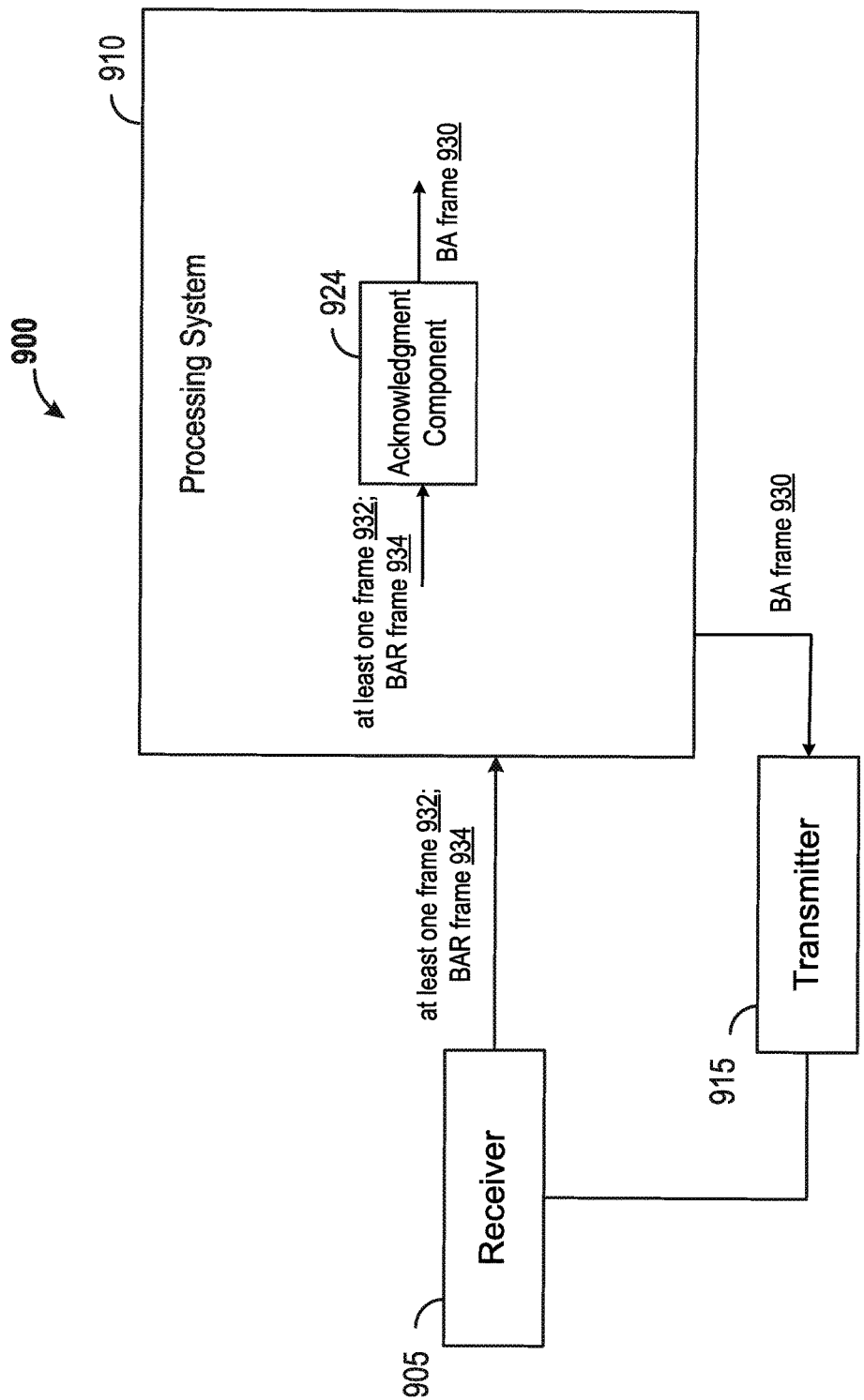
FIG. 9 is a functional block diagram of an exemplary wireless communication device that generates block acknowledgments.

FIG. 9 is a functional block diagram of an exemplary wireless communication device 900 that generates block acknowledgments. The wireless communication device 900 may include a receiver 905, a processing system 910, and a transmitter 915. The processing system 910 may include an acknowledgment component 924. The receiver 905, the processing system 910, and/or the acknowledgment component 924 may be configured to receive at least one frame 932 from at least one wireless device. The processing system 910 and/or the acknowledgment component 924 may be configured to generate a BA frame 930 that may include a bitmap based on the received at least one frame. The BA frame may include a fragment number field and a bitmap length indicator within the fragment number field that indicates a length of the bitmap within the BA frame. The transmitter 915, the processing system 910, and/or the acknowledgment component 924 may be configured to transmit the generated BA frame to the at least one wireless device. In an aspect, the fragment number field may be a subfield within a BA starting sequence control field of the BA frame, and the BA starting sequence control field may be a subfield within a BA information field of the BA frame. In another aspect, the fragment number field may further indicate whether the BA frame is acknowledging fragmented data transmissions. In another aspect, the BA frame may be a compressed BA frame or a multi-station BA frame. In this aspect, the fragment number field may include a first bit, a second bit, a third bit, and a fourth bit, and the second and third bits may correspond to the bitmap length indicator. In another aspect, the BA frame may be the compressed BA frame, and the bitmap length indicator may indicate whether the bitmap is 8 or 32 octets in length. In another aspect, the BA frame may be the multi-station BA frame, and the bitmap length indicator may indicate whether the bitmap is 2, 4, 8, or 32 octets in length. In another configuration, the processing system 910 and/or the acknowledgment component 924 may be configured to select the compressed BA frame or the multi-station BA frame based on an acknowledgment policy setting and on a type of data received in the at least one frame. In another aspect, the at least one frame may not be an action acknowledgment frame. In another configuration, the processing system 910 and/or the acknowledgment component 924 may be further configured to negotiate the length of the bitmap with the at least one wireless device during a BA setup period. The processing system 910 and/or the acknowledgment component 924 may be configured to negotiate by communicating with the at least one wireless device to determine a buffer size and by determining the length of the bitmap based on the buffer size. In another configuration, the receiver 905, the processing system 910, and/or the acknowledgment component 924 may be configured to receive a BAR frame 934 requesting the BA frame for the at least one frame. The BAR frame may include a second fragment number field and a second bitmap length indicator within the second fragment number field that indicates the length of the bitmap within the BA frame. The BA frame may be generated based on the received BAR frame.

The receiver 905, the processing system 910, the acknowledgment component 924, and/or the transmitter 915 may be configured to perform one or more functions discussed above. The receiver 905 may correspond to the receiver 1012. The processing system 910 may correspond to the processor 1004. The transmitter 915 may correspond to the transmitter 1010. The acknowledgment component 924 may correspond to the acknowledgment component 124, the acknowledgment component 126, and/or the acknowledgment component 1024.

In one configuration, the wireless communication device 900 may include means for receiving at least one frame from at least one wireless device. The wireless communication device 900 may include means for generating a BA frame that may include a bitmap based on the received at least one frame. The BA frame may include a fragment number field and a bitmap length indicator within the fragment number field that indicates a length of the bitmap within the BA frame. The wireless communication device 900 may include means for transmitting the generated BA frame to the at least one wireless device. In an aspect, the fragment number field may be a subfield within a BA starting sequence control field of the BA frame, and the BA starting sequence control field may be a subfield within a BA information field of the BA frame. In another aspect, the fragment number field may further indicate whether the BA frame is acknowledging fragmented data transmissions. In another aspect, the BA frame may be a compressed BA frame or a multi-station BA frame. In this aspect, the fragment number field may include a first bit, a second bit, a third bit, and a fourth bit, and the second and third bits may correspond to the bitmap length indicator. In another aspect, the BA frame may be the compressed BA frame, and the bitmap length indicator may indicate whether the bitmap is 8 or 32 octets in length. In another aspect, the BA frame may be the multi-station BA frame, and the bitmap length indicator may indicate whether the bitmap is 2, 4, 8, or 32 octets in length. In another configuration, the wireless communication device 900 may include means for generating the compressed BA frame or the multi-station BA frame based on an acknowledgment policy setting and on a type of data received in the at least one frame. In another aspect, the at least one frame may not be an action acknowledgment frame. In another configuration, the wireless communication device 900 may include means for negotiating the length of the bitmap with the at least one wireless device during a BA setup period. The means for negotiating may be configured to negotiate by communicating with the at least one wireless device to determine a buffer size and by determining the length of the bitmap based on the buffer size. In another configuration, the wireless communication device 900 may include means for receiving a BAR frame requesting the BA frame for the at least one frame. The BAR frame may include a second fragment number field and a second bitmap length indicator within the second fragment number field that indicates the length of the bitmap within the BA frame. The BA frame may be generated based on the received BAR frame.

For example, means for receiving may include the receiver 905, the processing system 910, and/or the acknowledgment component 924. Means for generating a BA frame may include the processing system 910 and/or the acknowledgment component 924. Means for transmitting the generated BA frame may include the transmitter 915, the processing system 910, and/or the acknowledgment component 924. Means for generating the compressed BA frame or the multi-station BA frame may include the processing system 910 and/or the acknowledgment component 924. Means for negotiating the length of the bitmap may include the processing system 910, the transmitter 915, the receiver 905, and/or the acknowledgment component 924. Means for receiving a BAR frame may include the receiver 905, the processing system 910, and/or the acknowledgment component 924.

The various operations of methods described above may be performed by any suitable means capable of performing the operations, such as various hardware and/or software component(s), circuits, and/or module(s). Generally, any operations illustrated in the Figures may be performed by corresponding functional means capable of performing the operations.

The various illustrative logical blocks, components and circuits described in connection with the present disclosure may be implemented or performed with a general purpose processor, a DSP, an ASIC, an FPGA or other PLD, discrete gate or transistor logic, discrete hardware components or any combination thereof designed to perform the functions described herein. A general purpose processor may be a microprocessor, but in the alternative, the processor may be any commercially available processor, controller, microcontroller or state machine. A processor may also be implemented as a combination of computing devices, e.g., a combination of a DSP and a microprocessor, a plurality of microprocessors, one or more microprocessors in conjunction with a DSP core, or any other such configuration.

In one or more aspects, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, compact disc (CD) ROM (CD-ROM) or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes CD, laser disc, optical disc, digital versatile disc (DVD), floppy disk and Blu-ray disc where disks usually reproduce data magnetically, while discs reproduce data optically with lasers. Thus, computer readable medium comprises a non-transitory computer readable medium (e.g., tangible media).

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

Thus, certain aspects may comprise a computer program product for performing the operations presented herein. For example, such a computer program product may comprise a computer readable medium having instructions stored (and/or encoded) thereon, the instructions being executable by one or more processors to perform the operations described herein. For certain aspects, the computer program product may include packaging material.

Further, it should be appreciated that components and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a CD or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

While the foregoing is directed to aspects of the present disclosure, other and further aspects of the disclosure may be devised without departing from the basic scope thereof, and the scope thereof is determined by the claims that follow.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f), unless the element is expressly recited using the phrase "means for" or, in the case of a method claim, the element is recited using the phrase "step for."

What is claimed is:

1. A method of wireless communication, comprising:
receiving at least one frame from at least one wireless device;
generating a block acknowledgment (BA) frame comprising a block acknowledge (ACK) bitmap based on the received at least one frame, wherein the BA frame is a compressed BA frame or a multi-station BA frame, the BA frame comprising a fragment number field and a bitmap length indicator within the fragment number field in a unified mapping that indicates a length of the block ACK bitmap within the compressed BA frame or the multi-station BA frame;
transmitting the generated BA frame to the at least one wireless device; and
receiving a block acknowledgment request (BAR) frame requesting the BA frame for the at least one frame, the BAR frame comprising a second fragment number field and a second bitmap length indicator within the second fragment number field that indicates the length of the block ACK bitmap within the BA frame, wherein the BA frame is generated based on the received BAR frame.

2. The method of claim 1, wherein the fragment number field is a subfield within a BA starting sequence control field of the BA frame, and the BA starting sequence control field is a subfield within a BA information field of the BA frame.

3. The method of claim 1, wherein the fragment number field further includes a fragmentation indicator, wherein the fragmentation indicator indicates whether the BA frame is acknowledging fragmented data transmissions.

4. The method of claim 1, wherein the bitmap length indicator comprises two bits.

5. The method of claim 4, wherein the BA frame is the compressed BA frame, wherein the bitmap length indicator indicates whether the block ACK bitmap is 8 or 32 octets in length.

6. The method of claim 4, wherein the BA frame is the multi-station BA frame, wherein the bitmap length indicator indicates whether the block ACK bitmap is 2, 4, 8, or 32 octets in length.

7. The method of claim 4, further comprising generating the compressed BA frame or the multi-station BA frame based on an acknowledgment policy setting and on a type of data received in the at least one frame, wherein the acknowledgment policy setting is one of no acknowledgment, normal acknowledgment or implicit block acknowledgment request, and wherein the type of data received is one of a medium access control (MAC) protocol data unit (MPDU), a very high throughput (VHT) single MPDU, an aggregated MPDU (A-MPDU), or a multi-traffic identifier (TID) A-MPDU.

8. The method of claim 7, wherein the at least one frame is a frame other than an action acknowledgment frame.

9. The method of claim 1, further comprising negotiating the length of the block ACK bitmap with the at least one wireless device during a BA setup period, the negotiating comprising:
communicating with the at least one wireless device to determine a buffer size; and
determining the length of the block ACK bitmap based on the buffer size.

10. An apparatus for wireless communication, comprising:
means for receiving at least one frame from at least one wireless device;
means for generating a block acknowledgment (BA) frame comprising a block acknowledge (ACK) bitmap based on the received at least one frame, wherein the BA frame is a compressed BA frame or a multi-station BA frame, the BA frame comprising a fragment number field and a bitmap length indicator within the fragment number field in a unified mapping that indicates a length of the block ACK bitmap within the compressed BA frame or the multi-station BA frame;
means for transmitting the generated BA frame to the at least one wireless device; and
means for receiving a block acknowledgment request (BAR) frame requesting the BA frame for the at least one frame, the BAR frame comprising a second fragment number field and a second bitmap length indicator within the second fragment number field that indicates the length of the block ACK bitmap within the BA frame, wherein the BA frame is generated based on the received BAR frame.

11. The apparatus of claim 10, wherein the fragment number field is a subfield within a BA starting sequence control field of the BA frame, and the BA starting sequence control field is a subfield within a BA information field of the BA frame.

12. The apparatus of claim 10, wherein the bitmap length indicator comprises two bits.

13. The apparatus of claim 12, wherein the BA frame is the compressed BA frame, wherein the bitmap length indicator indicates whether the block ACK bitmap is 8 or 32 octets in length, and wherein the BA frame is the multi-station BA frame, wherein the bitmap length indicator indicates whether the block ACK bitmap is 2, 4, 8, or 32 octets in length.

14. The apparatus of claim 12, further comprising means for generating the compressed BA frame or the multi-station BA frame based on an acknowledgment policy setting and on a type of data received in the at least one frame, wherein the acknowledgment policy setting is one of no acknowledgment, normal acknowledgment or implicit block acknowledgment request, and wherein the type of data received is one of a medium access control (MAC) protocol data unit (MPDU), a very high throughput (VHT) single MPDU, an aggregated MPDU (A-MPDU), or a multi-traffic identifier (TID) A-MPDU.

15. The apparatus of claim 10, further comprising means for negotiating the length of the block ACK bitmap with the at least one wireless device during a BA setup period, the means for negotiating being configured to:
communicate with the at least one wireless device to determine a buffer size; and
determine the length of the block ACK bitmap based on the buffer size.

16. An apparatus for wireless communication, comprising:
a memory; and
at least one processor coupled to the memory and configured to:
receive at least one frame from at least one wireless device;
generate a block acknowledgment (BA) frame comprising a block acknowledge (ACK) bitmap based on the received at least one frame, wherein the BA frame is a compressed BA frame or a multi-station BA frame, the BA frame comprising a fragment number field and a bitmap length indicator within the fragment number field in a unified mapping that indicates a length of the block ACK bitmap within the compressed BA frame or the multi-station BA frame;
transmit the generated BA frame to the at least one wireless device; and
receive a block acknowledgment request (BAR) frame requesting the BA frame for the at least one frame, the BAR frame comprising a second fragment number field and a second bitmap length indicator within the second fragment number field that indicates the length of the block ACK bitmap within the BA frame, wherein the BA frame is generated based on the received BAR frame.

17. The apparatus of claim 16, wherein the fragment number field is a subfield within a BA starting sequence control field of the BA frame, and the BA starting sequence control field is a subfield within a BA information field of the BA frame.

18. The apparatus of claim 16, wherein the fragment number field further includes a fragmentation indicator, wherein the fragmentation indicator indicates whether the BA frame is acknowledging fragmented data transmissions.

19. The apparatus of claim 16, wherein the bitmap length indicator comprises two bits.

20. The apparatus of claim 19, wherein the BA frame is the compressed BA frame, wherein the bitmap length indicator indicates whether the block ACK bitmap is 8 or 32 octets in length.

21. The apparatus of claim 19, wherein the BA frame is the multi-station BA frame, wherein the bitmap length indicator indicates whether the block ACK bitmap is 2, 4, 8, or 32 octets in length.

22. The apparatus of claim 19, wherein the at least one processor is further configured to select the compressed BA frame or the multi-station BA frame based on an acknowledgment policy setting and on a type of data received in the at least one frame.

23. The apparatus of claim 22, wherein the at least one frame is a frame other than an action acknowledgment frame.

24. The apparatus of claim 16, wherein the at least one processor is further configured to negotiate the length of the block ACK bitmap with the at least one wireless device during a BA setup period, wherein the at least one processor is configured to negotiate the length by:
communicating with the at least one wireless device to determine a buffer size; and
determining the length of the block ACK bitmap based on the buffer size.

25. A non-transitory computer-readable medium storing compute executable code for wireless communication, comprising code to:

receive at least one frame from at least one wireless device;

generate a block acknowledgment (BA) frame comprising a block acknowledge (ACK) bitmap based on the received at least one frame, wherein the BA frame is a compressed BA frame or a multi-station BA frame, the BA frame comprising a fragment number field and a bitmap length indicator within the fragment number field in a unified mapping that indicates a length of the block ACK bitmap within the compressed BA frame or the multi-station BA frame;

transmit the generated BA frame to the at least one wireless device; and receive a block acknowledgment request (BAR) frame requesting the BA frame for the at least one frame, the BAR frame comprising a second fragment number field and a second bitmap length indicator within the second fragment number field that indicates the length of the block ACK bitmap within the BA frame, wherein the BA frame is generated based on the received BAR frame.

* * * * *